A. B. Nott,
Kitchen Sink.
No. 97,219. Patented Nov. 23, 1869.
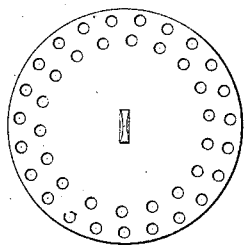
Fig. 2
Fig. 1
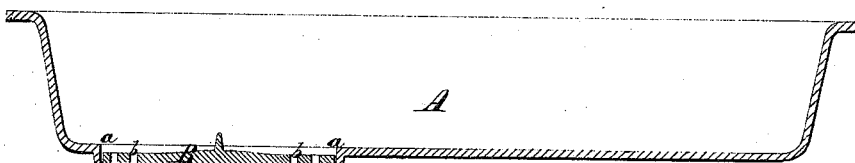
Fig. 3
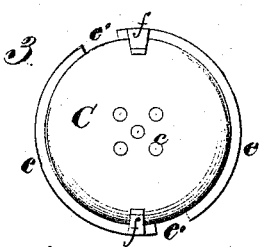
Fig. 4
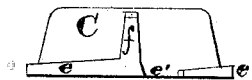
Fig. 5
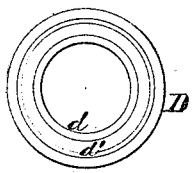
Fig. 6
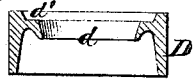
Fig. 7
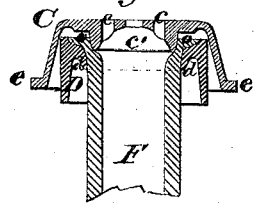
Witnesses.
R. Campbell
J. C. Campbell
Inventor
A. B. Nott
by his atty.
Mason Fenwick Lawrence

UNITED STATES PATENT OFFICE.

AARON B. NOTT, OF FAIRHAVEN, MASSACHUSETTS.

IMPROVEMENT IN KITCHEN-SINKS.

Specification forming part of Letters Patent No. 97,219, dated November 23, 1869.

*To all whom it may concern:*

Be it known that I, AARON B. NOTT, of Fairhaven, in the county of Bristol and State of Massachusetts, have invented a new and useful Improvement in Kitchen-Sinks; and I do hereby declare that the following is a full, clear, and exact description thereof, reference being had to the accompanying drawings, making part of this specification, in which—

Figure 1 is a section taken longitudinally and in a vertical plane through a sink having my improvement applied to it. Fig. 2 is a top view of the strainer-disk which covers the depression in which the waste-pipe is secured. Figs. 3, 4, 5, 6, and 7 are different views of the parts employed in effecting a tight connection of the waste-pipe to the sink.

Similar letters of reference indicate corresponding parts in the several figures.

This invention relates to a new and useful improvement on attaching waste or escape pipes to sinks, whereby the objections attending the soldering of these pipes to the bottoms of the sinks are avoided, and the pipes are so attached that they can be readily removed or replaced at pleasure and kept tight and free from obstructions.

The nature of my invention consists in securing the upper end of a waste or escape pipe to the upper side of a concave depression made into the bottom of a sink by means of a clamping screw-cap, which is caused to press a flange formed on said pipe into a seat formed into the upper end of a packing-ring, as will be hereinafter explained.

To enable others skilled in the art to understand my invention, I will describe its construction and operation.

In the accompanying drawings, A represents a sink, which may be made of the usual rectangular form or of any other required form; and E represents a concave depression which is formed in the bottom of this sink, near one end, and which extends below the upper side of the bottom plate in the form of a hemisphere. Through the center of this depression E a circular opening is made, which is surrounded by an annular upwardly-rising lip, $i$, having its upper edge rounded and slightly tapered, as shown in Fig. 1. The annular lip $i$ receives upon it a ring-cap, D, having an internal flange, $d$, which forms between it and the body of the ring an annular cavity, into which the lip $i$ is snugly fitted. This ring-cap D has an annular depression, $d'$, in its upper end, into which is fitted a flange, $o$, that is formed on the upper end of the escape-pipe F, which pipe is carried down through ring D and through the opening made through the depression E, as shown in Fig. 1.

C is a cap, which has two tapering flanges or ribs, $e\ e$, formed on it, which terminate at $e\ e$, near which notches are stop-ribs $f\ f$. Through the top of this cap C holes $c$ are made, and on the bottom side of this cap is an annular rib or flange, $c'$, which, when the cap is confined in place, as shown in Figs. 1 and 7, is forced down hard upon the flange $o$ of pipe F, thereby forcing this flange $o$ into its seat $d'$ in ring D, and also forcing this ring firmly down upon the lip $i$. The tapering ribs $e\ e$ are parts of screw-threads, and are received beneath the overhanging lugs $g\ g$, which are formed on the interior of the depression E. The lugs $g\ g$ are located diametrically opposite each other, so that by holding the cap C, with its notches $e'\ e'$, in a line with the lugs, dropping it, and then turning it slightly, the joints will be drawn tight.

Above the cap C, and seated upon an annular shoulder, $a$, at the upper termination of the depression F, is a movable strainer, B, consisting of a flat circular plate having a central handle or lifting-piece on its upper side, and an annular flange or curtain, $b'$, extending down from its bottom side and centrally arranged with respect to this plate or strainer. Outside of this curtain $b'$ the plate is thickly perforated for allowing liquids to pass through it. This strainer can be lifted out of its seat at any time.

It will be seen from the above description that the flanged pipe F is confined tightly in place upon the upper side of the depression E by means of the screw-cap C, through which perforations are made for the escape into said pipe of the fluids which enter the depression E. This cap presses the flange $o$ down firmly into its seat upon ring D, and also presses and confines the ring D tightly in place upon the lip $i$, thereby preventing all escape of liquid except through the perforations $c$. The strainer B, with its annular curtain $b'$, serves two important purposes, to wit: It prevents solid substances from entering the chamber which it incloses, and its curtain $b'$, by extending below the top of the cap C, forms a trap for preventing stench from rising, but allows the depression E above the level of the top of cap C.

Having described my invention, what I claim as new, and desire to secure by Letters Patent, is—

1. The flanged pipe F, held in place and secured tightly by means of the ring D and screw-cap C, substantially as described.

2. Ring D, constructed as described, and fitted upon a lip, $i$, rising from the depression E, in combination with a perforated screw-cap and its annular rib $c'$, substantially as described.

3. The strainer B, constructed with a curtain, $b'$, so as to form a stench-trap in the depression E, substantially as described.

AARON B. NOTT.

Witnesses:
AUGUSTUS SWIFT,
P. E. MENIHEW.